(No Model.) 2 Sheets—Sheet 2.
A. DAVIS.
FILTER.
No. 545,122. Patented Aug. 27, 1895.
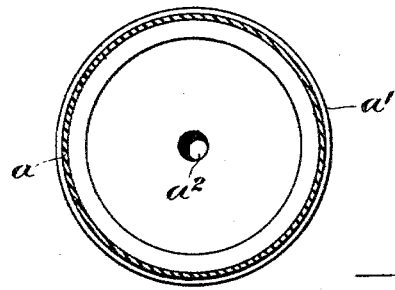
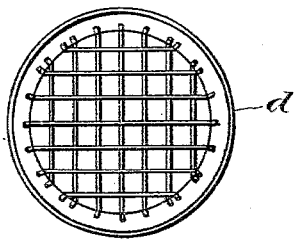
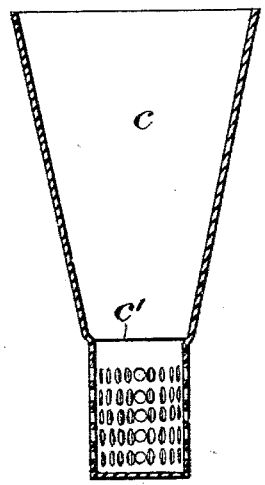
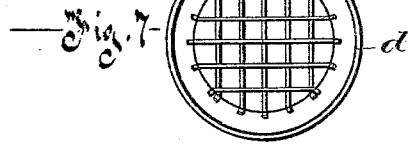
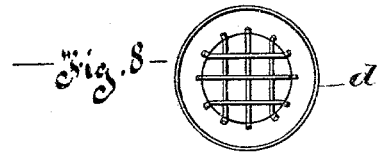
Witnesses
Inventor
Adolphus Davis
By his Attorney

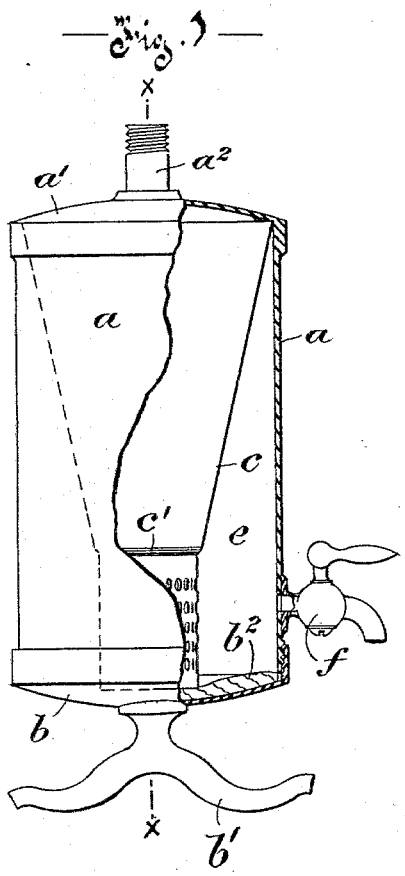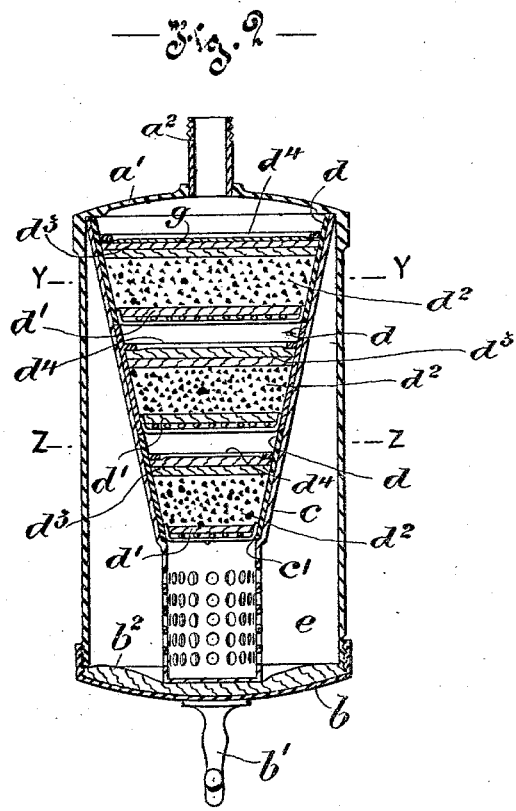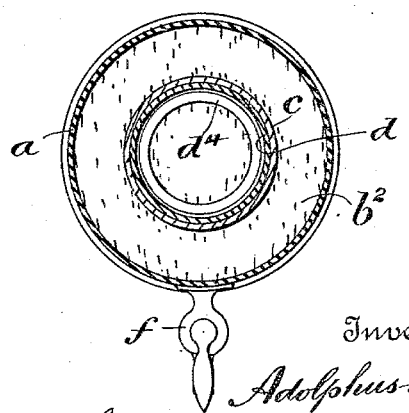

UNITED STATES PATENT OFFICE.

ADOLPHUS DAVIS, OF MONTREAL, CANADA.

FILTER.

SPECIFICATION forming part of Letters Patent No. 545,122, dated August 27, 1895.

Application filed February 12, 1894. Renewed June 22, 1895. Serial No. 553,735. (No model.)

*To all whom it may concern:*

Be it known that I, ADOLPHUS DAVIS, of the city of Montreal, in the district of Montreal and Province of Quebec, Canada, have invented certain new and useful Improvements in Filters; and I do hereby declare that the following is a full, clear, and exact description of the same.

This invention relates more particularly to filters adapted for household purposes, and is intended to be attached to the usual supply-pipes or taps in a dwelling or building; but it will be obvious that its application is not limited to such use.

The object of the invention is to provide a filter the parts of which can be readily separated for cleansing purposes and as easily set together again and the filtering qualities of which will be improved by the construction.

The invention consists of a filter composed of an outer casing, an inner removable funnel-shaped carrier-section to receive a number of removable filtering-sections, and a removable bottom or retaining end piece to the outer casing, which upon being set in place serves to hold the several parts together and upon removal allows of their disconnection. For full comprehension, however, of the invention reference must be had to the annexed drawings, forming a part of this specification, in which like symbols indicate corresponding parts, and wherein—

Figure 1 is a side elevation of my improved filter with outer casing broken away; Fig. 2, a vertical section of filter on line $x\,x$, Fig. 1; Fig. 3, a horizontal section through filter on line $z\,z$, Fig. 2; Fig. 4, a horizontal section on line Y Y, Fig. 2, of outer casing, looking up; Fig. 5, a detail vertical section of funnel-shaped carrier removed; Figs. 6, 7, and 8, detail plan views of the filtering-sections removed from the funnel-shaped carrier-section; and Fig. 9, a detail side elevation of one of the filtering-sections.

$a$ is the main portion of the outer inclosing-casing, preferably of cylindrical form and having the integral top end piece $a'$ perforated and provided with a projecting screw-threaded tube portion $a^2$ to allow of connection with the tap or supply-pipe by any suitable coupling device. The lower end of the casing $a$ is screw-threaded on its outside to receive the interiorly-screw-threaded flange of a removable bottom or end piece $b$, having a suitable finger-bar $b'$ for convenience in handling and preferably containing a suitable flexible cushion $b^2$, composed of felting, rubber, or the like, for the purpose of tightly holding the funnel-shaped section, now to be described, in place up against the top of the casing.

$c$ is the internal removable funnel-shaped section, the upper end of which is just about wide enough to secure a perfect joint on all sides at the upper end of the outer casing, and it is forced tightly up against the top end thereof by the screwing up of the bottom piece $b$, which bears upon the lower end of the funnel-shaped section $c$ through the cushion $b^2$.

Within the funnel-shaped section are arranged a number of removable filtering-sections, three being shown in this case, each of which preferably comprises a dish or frame $d$ with foraminiferous bottom, a section of felting $d'$ over this bottom, a body $d^2$ of granular substance, such as very fine particles of charcoal and small gravel, upon this felting, and a second section of felting $d^3$, preferably composed of two layers, on this granular substance, the whole being firmly set in place by a ring $d^4$, pressed down upon the upper section of felting.

The use of two layers of felt to form the section $d^3$ is to guard as much as possible against foreign cutting metallic particles making their way through, since while they might penetrate the first layer there is a possibility of their being arrested by the second.

The filtering-sections are of varying diameters and their walls inclined to correspond with the funnel shape of the internal section $c$, serving as a carrier for them, so that they can be set in place one over the other, the lowermost resting on a ledge $c'$, formed in the wall of the section $c$ and set compactly against the wall of such carrier-section, thus compelling all the water entering the upper end of the filter to pass through the filtering-bodies of the several sections, and I prefer to arrange a sheet of cotton $g$ over the uppermost filter-section, so as to further improve the filtering qualities of the filter.

The wall of the carrier-section $c$ is perforated, as at $c^2$, below the lowermost filtering-section for the passage of the filtered water into the outer chamber e, whence it can be drawn through any suitable outlet-cock f.

The simplicity and detachability of the parts render the filter just described very easy to construct and clean, and the disposition of the sections of felting where shown serves to retain the granular substance in position and allows a very fine grain to be used with consequently an improved degree of filtration.

What I claim is as follows:

1. In a filter, the combination with an outer casing, having suitable inlet and outlet, of a removable end piece for same, a removable internal carrier section held in position within the casing, to communicate with the inlet thereof, by said removable end piece when in place, and a number of removable filtering sections carried within said internal section the wall of which is perforated at a point below the lowermost of said filtering sections for the purpose set forth.

2. The filtering section composed of a hollow dish with open top inclined sides and foraminiferous bottom, and containing a section of felting upon said bottom, a body of granular substance upon such felting, a double layer of felting over such granular substance and a retaining device in the form of a ring forced downward to bear tightly against the sides of the dish and overlapping the edge of the uppermost layer of felting for the purpose set forth.

3. In a filter, the combination of casing $a$, having an inlet opening at its top end, and outlet as at $f$, a removable bottom end piece $b$, having suitable finger hold $b'$, internal removable funnel-shaped section $c$ perforated as at $c'$, and filtering sections as described carried within said section $c$ for the purposes set forth.

Montreal, 7th day of February, 1894.

ADOLPHUS DAVIS.

In presence of—
WILL P. MCFEAT,
FRED. J. SEARS.